Patented May 17, 1932

1,858,731

UNITED STATES PATENT OFFICE

OTTO ERNST AND KURT SPONSEL, OF HOCHST-ON-THE-MAIN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS OF PREPARING ETHERS OF CARBOHYDRATES

No Drawing. Application filed June 22, 1928, Serial No. 287,642, and in Germany June 30, 1927.

Our present invention relates to ethers of carbohydrates of the type $(C_6H_{10}O_5)x$ such as cellulose, starch or the like and to a process of making them.

As is known, ethers of cellulose and other carbohydrates of the type $(C_6H_{10}O_5)x$ are manufactured in such a manner that there is first prepared alkali cellulose by soaking, for instance cellulose board, squeezing and tearing it up into fibers and then, if desired after having allowed the mass to mature and dry, treating the alkali cellulose thus obtained with an alkylating agent. In order to accelerate the soaking operation it has already been proposed, to carry it out while excluding air, for instance in vacuo, or in the atmosphere of an indifferent gas. The cellulose-ethers hitherto produced from so prepared alkali celluloses are however of no uniform constitution, which becomes evident particularly when they are dissolved in an organic or an aqueous solvent.

We have now found that entirely uniform, supple and ropy solutions of the cellulose ethers are obtained by entirely excluding the air prior to and during the preparation of alkali cellulose. This can be realized by treating the cellulose material with carbon dioxide. This operation is advantageously performed in a vacuum in order to completely exclude the air. In order to wash the pores of the cellulose free from the gases (air) left therein, the cellulose is treated in the atmosphere of carbon dioxide; in this manner the alkali lye subsequently introduced causes absorption of carbon dioxide so that the lye can completely enter and fill up the pores.

The following example serves to illustrate our invention, but it is not intended to limit it thereto.

(1) Air-moist cellulose board is dried in a vacuum drying-chamber while passing carbonic acid through the latter at 60° C. whereby the material is freed from the air contained therein. The chamber is then filled with caustic soda lye of high percentage and the board is allowed to swell up for some time. After the material has been squeezed, the resulting alkali cellulose is quite ready for being used in the preparation of cellulose ethers and is then treated in known manner with an alkylating, aralkylating- or arylating agent.

We claim:

1. In the process of preparing ethers of cellulose, the step which comprises expelling the air from the cellulose by means of gaseous carbon-dioxide, and subsequently removing the carbon-dioxide by means of an alkali solution.

2. In the process of preparing ethers of cellulose, the step which comprises expelling the air from cellulose in a vacuum by means of carbon-dioxide, and subsequently removing the carbon-dioxide by means of an alkali solution.

3. In the process of preparing ethers of a carbohydrate of the type formula $(C_6H_{10}O_5)x$ the step which comprises expelling the air from the carbohydrate by means of gaseous carbon dioxide and subsequently removing the carbon dioxide by means of an alkali solution.

4. In the process of preparing ethers of a carbohydrate of the type formula $(C_6H_{10}O_5)x$ the step which comprises expelling the air from the carbohydrate in a vacuum by means of gaseous carbon dioxide and subsequently removing the carbon dioxide by means of an alkali solution.

In testimony whereof, we affix our signatures.

OTTO ERNST.
KURT SPONSEL.